United States Patent

[11] 3,536,219

| [72] | Inventor | Albert G. Williams<br>West Orange, New Jersey |
|---|---|---|
| [21] | Appl. No. | 797,345 |
| [22] | Filed | Jan. 23, 1969<br>Continuation of Ser. No.<br>535,619, Dec. 3, 1965, abandoned,<br>which is a division of Ser. No.<br>92,738, Mar. 2, 1961, abandoned,<br>which is a continuation of Ser. No.<br>44,543, July 22, 1960, abandoned. |
| [45] | Patented | Oct. 27, 1970 |
| [73] | Assignee | Celanese Corporation<br>New York, New York<br>a corporation of Delaware |

[54] PROCESS FOR PREPARING HIGH TENACITY POLYOXYMETHYLENE FIBERS
7 Claims, No Drawings

[52] U.S. Cl. .................................................. 264/210,
264/205, 264/208, 264/290

[51] Int. Cl. ....................................................... D01d 5/12

[50] Field of Search............................................ 264/290,
210, 208, 205

[56] References Cited
UNITED STATES PATENTS

| 2,807,863 | 10/1957 | Schenken...................... | 28/72 |
| 2,844,561 | 7/1958 | Bechtold et al.............. | 260/45.5 |
| 2,942,325 | 6/1960 | Spellman. | |
| 3,027,352 | 3/1962 | Walling et al. | |
| 3,156,750 | 11/1964 | Cuculo. | |
| 3,347,969 | 10/1967 | Moelter. | |
| 3,479,314 | 11/1969 | Williams. | |

*Primary Examiner*—Julius Frome
*Assistant Examiner*—Jay H. Woo
*Attorneys*—D. J. DeWitt and C. B. Barris ABSTRACT: High tenacity polyoxymethylene fibers are prepared by forming a liquid stream of said polymer by extrusion through a spinning orifice, solidifying said stream to form a filament and subjecting said filament to a two-stage draw.

PROCESS FOR PREPARING HIGH TENACITY POLYOXYMETHYLONE FIBERS

This application is a continuation of U.S. Pat. application Ser. No. 535,619, filed Dec. 3, 1965, now abandoned, which is a division of Ser. No. 92,738, filed Mar. 2, 1961, now abandoned, which in turn is a continuation-in-part of Ser. No. 44,543, filed July 22, 1960, now abandoned.

This invention relates to high tenacity fibers and to the preparation of such fibers from oxymethylene polymers.

Oxymethylene polymers, having successively recurring -$CH_2O$- units have been known for many years. They may be prepared by the polymerization of anhydrous formaldehyde or by the polymerization of trioxane which is a cyclic trimer of formaldehyde.

High molecular weight oxymethylene polymers may be prepared in high yields and at rapid reaction rates by the use of acidic boron fluoride-containing catalysts such as boron fluoride itself, and boron fluoride coordinate complexes with organic compounds in which oxygen or sulfur is the donor atom, as described in U.S. Pat. application Ser. Nos. 691,144 and 691,143 both filed Oct. 21, 1957 by Hudgin and Berardinelli and incorporated herein by reference.

Oxymethylene polymers of improved thermal stability have been prepared by copolymerizing trioxane with from 0.5 to 25-mol percent of a cyclic ether having adjacent carbon atoms. Copolymers of this type are described in U.S. Pat. application Ser. No. 718,148, filed Feb. 28, 1958 by Walling, Brown and Bartz and incorporated herein by reference. The preferred copolymers are those made up of oxymethylene and oxyethylene groups, such as copolymers of trioxane with dioxolane or with ethylene oxide.

Among the oxymethylene polymers which may be used in this invention are oxymethylene homopolymers, with stabilizing end groups if desired, and oxymethylene copolymers, particularly those having a recurring structure comprising recurring units having the formula 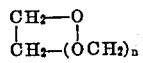, wherein $n$ is an integer from zero to 5 and wherein $n$ is zero in from 75 to 99.5 percent of the recurring units.

A preferred class of copolymers are those having a structure comprising recurring units having the formula (-O-$CH_2$-($CH_2$)$_n$-) wherein $n$ is an integer from zero to 2 and wherein $n$ is zero ranging from 75 to 99.5 percent of the recurring units. These copolymers are prepared by copolymerizing trioxane with a cyclic ether having the structure $$\begin{array}{c} CH_2-O \\ | \quad | \\ CH_2-(OCH_2)_n \end{array}$$

where $n$ is an integer from zero to 2.

Among the specific cyclic ethers which may be used are ethylene oxide, 1,3, dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide It has now been found that fibers of extraordinarily high tenacity and modulus may be prepared by forming a liquid stream of an oxymethylene polymer by extrusion through a spinning orifice, solidifying said stream to form a filament and subjecting said filament to a two-stage draw.

The extrusion step of this invention may be a melt extrusion or it may be a solvent extrusion into a drying or a coagulating environment.

One suitable method of extrusion, described in my parent application Ser. No. 44,543, involves the passage through a spinning orifice of a molten mixture comprising an oxymethylene polymer and up to 50 weight percent of a material which is miscible with a melt of said polymer and which reduces the viscosity of such a melt. Preferably, the material is one which is miscible with said polymer at its natural melting temperature to form single phase liquid mixtures containing at least 10 weight percent of said material and which at said weight percent level and at said melting temperatures reduces the absolute viscosity of the liquid polymer by at least 20 percent.

Among the suitable materials which may be used are formamides, such as formamide, itself, N,N-diemthyl formamide and N-methyl-N-phenyl formamide; phenols, such as phenol, 3,4-xylenol, o-cyclohexyl phenol and alpha naphthol; halogen-substituted aliphatic hydrocarbons, such as symmetrical tetrachloroethane and ethylene bromide; lactones, such as gamma butyrolactone; aromatic amines, such as aniline and o-toluidene and aryl phosphates, such as tricresyl phosphate and trixylenyl phosphate.

The polymer and the viscosity-reducing material may be blended in liquid phase after the polymer has been melted. But it is preferred to blend the materials while the polymer is in a semi-solid state as a plastic mass. The materials may be blended, for example, while being worked on a two-roll rolling mill or in a blending extruder.

The preferred proportion of viscosity-reducing material in the blend to be melt spun is between about 1 and 40 percent based on the weight of the resin. Where the viscosity-reducing material is a relatively volatile material, such as dimethyl formamide, a higher proportion, such as between about 3 and 50 percent based on the weight of the resin, must be charged to the blending operation to produce a final blend in the proportions desired, unless precautions, such as the use of superatmospheric pressure, are taken to reduce the volatilization of the agent during blending.

The spinning operation is carried out in a unit which melts or dissolves the solid polymer and pumps it at a constant rate and under fairly high pressure through the small holes in a spinnerette.

Typical melt spinning temperatures may range from about 140° to about 230°C., with temperatures from about 180° to about 230°C., being preferred for homopolymers without viscosity-reducing material, temperatures from about 140° to about 230°C. for copolymers without viscosity-reducing material. For polymers containing a viscosity-reducing material the melt spinning temperature may be up to 40°C. lower.

The polymer is generally melted by subjecting chips of the polymer to the action of a heated screw extruder. The chips are suitably between about 200 and 2 mesh. The melt is forced through the spinnerette orifices by a metering pump. Generally, a filter or sand pack is maintained upstream of the orifices to remove particles or gels which might block them. Preferably, the polymer is maintained as a melt for not more than 600 seconds.

The spinnerette may contain from one to about 500 orifices. For most textile purposes, the orifices may be between about 5 and 25 mils in diameter. Monofilaments, for special uses such as tow rope, may be extruded through orifices up to 100 mils in diameter. The liquid streams emerge from the orifices, generally downwardly, into a gaseous medium, which may be air or an inert gas and solidify. The filaments are taken up at a velocity between about 1 and 250 feet per second.

Solution spinning temperatures may range from about 125° to 210°C. The polymer concentration in the solution may range from about 5 to about 25 weight percent. Suitable solvents for solution spinning include dimethyl formamide, benzyl alcohol, anisole and butyrolactone.

The polymer streams, in solution spinning, may be spun into air or an inert gas, as in melt spinning. Solidification takes place by evaporation of the solvent by the cooling of the solution. The polymer streams may also be spun into a nonsolvent liquid where solidification takes place by the reduced solvent power of the system. Suitable nonsolvents include water, hydrocarbons and alcohols.

It is generally desirable to incorporate one or more thermal stabilizers into the oxymethylene polymer in order to enhance its thermal stability.

The proportion of stabilizer incorporated depends upon the specific stabilizer used. A proportion between about 0.05 and 10 weight percent (based on the weight of polymer) has been found to be suitable for most stabilizers.

The stabilizers are generally incorporated into the resin prior to the blending thereof with the viscosity-reducing material. If desired, however, all or a portion of the stabilizer may be incorporated during or after the blending of the resin with the viscosity-reducing material.

One suitable stabilizer system is a combination of an antioxidant ingredient such as phenolic anti-oxidant and most suitably a substituted bisphenol and an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(methylene-6-tertiary butyl phenol) and 4,4'-butylidene bis-(6 tertiary butyl-3-methyl phenol). Suitable phenolic stabilizers other than alkylene bis-phenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, compounds having tertiary amine and terminal amide groups, compounds having amidine groups, cycloaliphatic amine compounds and aliphatic acylureas. Suitable scission inhibitors as well as suitable antioxidants and proportions are disclosed in U.S. Pat. application Ser. No. 826,115 filed by Dolce on July 10, 1959, application Ser. No. 831,720, filed by Dolce, Berardinelli and Hudgin on Aug. 5, 1959, application Ser. No. 838,427, filed by Berardinelli on Sept. 8, 1959, application Ser. No. 838,832, filed by Dolce and Hudgin on Sept. 9, 1959, application Ser. No. 841,690, filed by Kray and Dolce on Sept. 23, 1959, application Ser. No. 851,560, filed by Berardinelli, Kray and Dolce on Nov. 9, 1959, application Ser. No. 1,457, filed by Dolce and Berardinelli on Jan. 11, 1960 and application Ser. No. 4,881 filed by Kray and Dolce on Jan. 27, 1960. The disclosures of the above mentioned applications are incorporated herein by reference.

The stabilizers may be incorporated into the polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, in finely divided dry state may be blended into finely divided polymer in any suitable blending apparatus.

One suitable method of incorporation of the chemical stabilizers is by blending a dry solid stabilizer into the plastic polymer while the latter is being kneaded as on heated rolls or through an extruder.

The drawing operation improves the physical properties of the filaments by orientation of the polymer molecules. In the two-stage draw, the filaments are usually drawn to about 3 to 15 times their original lengths in a first state at a temperature between about 60° to 160°C. and then to about 1.05 to 6 times their drawn length in a second stage at 100° to 165°C. Preferably, the first stage draw is at 120° to 150°C. and the second stage draw at 150° to 160°C. and the second stage draw is to 1.05 to 2 times the first drawn length. Generally, the second stage draw is at a higher temperature than the first stage draw.

The drawing is usually accomplished by a feed roll-draw roll system wherein the draw roll has a higher peripheral speed than the feed roll. Heating of the filamentary material takes place between the feed roll and the draw roll. A heated shoe having a contact length between about 4 inches and 14 inches is a convenient means of heating the filamentary material. The filamentary material may also be heated by passing around a heated pin (1 to 3 wraps), by passing through a heated tube (hot air and radiant heat) or by passing through a heated liquid bath between the feed roll and the draw roll.

After the second stage draw, the filaments may be wound up on bobbins or cut into staple fiber of any desired length.

A fiber produced in accordance with this invention generally has a tenacity in excess of 7 g./denier and usually between 9 and 14 g./denier, a modulus between 50 and 180 g./denier and an elongation of 10 to 25 percent.

The fiber may be used for the production of textile materials by weaving or knitting as well as for the production of hosiery, carpeting and bedding material.

EXAMPLE I

An oxymethylene polymer resin containing 96.2 weight percent of monomeric units derived from trioxane and 3.8 weight percent of monomer units derived from 1,3-dioxolane was mixed with 30 percent of its weight of dimethyl formamide. The resin contained one weight percent each of malonamide and 2,2'-methylene-bis (4-methyl-6-tertiary butyl phenol) as stabilizers. The polymer had an inherent viscosity of 1.22 dl/g. at 0.1 weight percent in p-chlorophenol containing 2 weight percent of pinene and a degradation rate of 0.05 weight percent lost per minute when maintained at 222°C. in an open vessel via a circulating air oven. The polymer was in the form of ground chips having particles from 4 to 200 mesh and was admixed with the dimethyl formamide by tumbling in a tightly covered glass container.

The mixture was warmed in an oven at 60°C. for 4 hours and then rolled at 33 r.p.m. on a two-roll rolling mill having rolls of 6 inches diameter and 12 inch in length. The temperature of one roll was maintained at 160°C. and the second roll was at 166°C. Rolling was continued for 8 minutes at which time a stringy plastic mass was obtained. The polymer was cut up and ground to pellets of 8 to 200 mesh which has a dimethyl formamide content of 3 weight percent.

The pellets were spun on a screw extruder which discharged into a spinning pack block. The screw extruder contained both a cold feed section and a heated barrel for conversion of the solid polymer to a liquid of suitable viscosity for fiber preparation. In addition the screw also developed sufficient pressure to force the liquid polymer through the filter pack which consisted of two 50-mesh screens with two-250 mesh screens alternating.

The spinneret contained 10-holes, each hole having a diameter of 20 mils.

Conversion of the polymer to fiber was accomplished at a screw barrel temperature of 175° to 180°C. with the spinneret at 175°C. The melt contained approximately 12 ml. of fluid polymer. Throughput rate of 3 ml. of fluid polymer per minute was employed giving average residence time of polymer in molten state of about 4 minutes. The takeup speed was 195.7 m./min. The yarn produced had no residual dimethyl formamide.

The yarn was drawn to 9.05 times its original length on a heated shoe using 12-inch contact length. Shoe temperature was maintained at 134°C. Draw speed of the yarn was 10.2 m./min. Under these conditions about 6,000 meters of yarn were prepared which had a tenacity of 6.1 g./d and elongation of 21.5 percent and denier per filament of 3.90.

A portion of the yarn so produced was given a second stage drawing using a draw ratio of 1.8 to 1 at a draw speed of 10.5 m./min over a hot shoe. Contact length with the hot shoe was 12-inches at a shoe temperature of 137°C. 6,204 meters of yarn were produced by this technique. The yarn had a tenacity of 9.9 g./d, an elongation of 13.9 percent and was of 2.74 denier per fil.

EXAMPLE II

An oxymethylene polymer resin containing 97.5 weight percent of monomeric units derived from trioxane and 2.5 weight percent of units derived from ethylene oxide was stabilized with 0.75 weight percent of 2,2'-methylene-bis(4-methyl-6-tertiary butyl phenol) and 0.15 weight percent of cyanoguanidine and extruded and chopped into pellets about one eighth inch in diameter and about one eighth inch long.

The pellets were extruded through a screw pump extruder maintained at 190°C. at the barrel, the pump and the sand pack. A screw discharge pressure of 1,500 lbs. and a pump discharge pressure of 3,650 lbs. were developed. The polymer was extruded through a single 0.015 inch jet, cooled in ambient air and taken up at 265 meters/min. on a ring twister as a monofil of 149 denier.

The above monofil was drawn over a heated shoe of 12 inch length maintained at 147°C. The draw roll peripheral speed was 104 meters/min. and the draw ratio was 9.05. The singly drawn monofil had a denier of 16.4, an elongation of 19 percent, a tenacity of 10.74 g./denier and a modulus of 82.7 g./denier.

The drawn monofil was subjected to a second draw over a 12 inch shoe heated to 160°C. The draw roll speed was 54 meters/min. and the draw ratio was 1.5. The doubly drawn monofil had a denier of 11.2, and elongation of 13.4 percent a tenacity of 13.5 g./denier and a modulus of 155.5 g./denier.

In this example the first draw took place about 2 weeks after the spinning and the second draw took place 4 days after the first with the fiber stored at room temperature, wound on a spool in each case. However, it is not essential that the fiber be stored between the spinning and the first draw or between the first and second draws.

The first draw may, if desired, follow the spinning immediately if the spinning speeds and drawing speeds can be conveniently correlated. More commonly, the second draw may follow the first draw immediately with the draw roll of the first draw serving as the feed roll of the second draw.

It is to be understood that the foregoing detailed description is given merely by way of illustration and that many variations may be made therein without departing from the spirit of my invention.

I claim:

1. Method of producing fibers having a tenacity greater than about 7 g./denier by subjecting fibers to a two-stage draw which comprises forming a liquid stream of an oxymethylene polymer by extrusion through a spinning orifice, solidifying said stream to form a filament, drawing said filament to between 3 and 20 times its original length while maintaining its temperature between about 60° and 160°C., and drawing said drawn filament to about 1.05 to 6 times the first drawn length in a second stage at a temperature higher than the first draw temperature and between about 100° to 165°C.

2. The method of claim 1 wherein each stage of said two-stage draw is effected in an ambient atmosphere.

3. The method of producing oxymethylene polymer filamentary material having a tenacity between about 9 and about 14 g./denier which comprises forming a liquid stream of an oxymethylene polymer by extrusion through a spinning orifice, solidifying said stream to form a filament, drawing said filament to between 3 and 20 times its original length or maintaining its temperature between about 120° and 150°C. and drawing said drawn filament to about 1.05 to 6 times the first drawn length in a second stage at a temperature higher than the first draw temperature and at a temperature between about 150° and 160°C.

4. The method of claim 3 wherein said filamentary material is drawn in the second stage draw to a length of about 1.05 to 2 times the first drawn length.

5. The method of claim 3 wherein each stage of said two-stage draw is effected in an ambient atmosphere.

6. The method of claim 5 wherein said filamentary material is heated by means of a heated shoe.

7. A method of producing an oxymethylene polymer filamentary material having a tenacity between about 9 and about 14 g./denier, a modulus between about 50 and about 180 d./denier and an elongation between about 10 and 25 percent by subjecting said filamentary material to a two-stage draw which which comprises forming a liquid stream of an oxymethylene polymer by extrusion through a spinning orifice, solidifying said stream to form a filament, drawing said filament to between 3 and 20 times its original length while maintaining its temperature between about 120° and 150°C. and drawing said filament to about 1.05 to 2 times the first drawn length in the second stage at a temperature higher than the first draw temperature and then a temperature between about 150° and 160°C.

Docket No. 3656AZB

UNITED STATES PATENT OFFICE
CERTIFICATE OF CORRECTION

Patent No. 3,536,219　　　　　　　　Dated October 27, 1970

Inventor(s) Albert G. Williams

It is certified that error appears in the above-identified patent and that said Letters Patent are hereby corrected as shown below:

In Column 1, line 45, replace ---ranging from--- with ---in from---.

In Column 3, line 18, replace ---(methylene-6-tertiary butyl phenol)--- with --- (methyl-6-tertiary butyl phenol)---.

In Column 6, line 31, delete ---which---.

Signed and sealed this 11th day of May 1971.

(SEAL)
Attest:

EDWARD M. FLETCHER, JR.　　　　　　　WILLIAM E. SCHUYLER, JR.
Attesting Officer　　　　　　　　　　 Commissioner of Patents